(12) United States Patent
Hwang et al.

(10) Patent No.: US 7,543,514 B2
(45) Date of Patent: Jun. 9, 2009

(54) BALL SCREW DEVICE HAVING LUBRICATION WARNING DEVICE

(75) Inventors: Yih Chyun Hwang, Taichung (TW); Yu Shan Lee, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 122 days.

(21) Appl. No.: 11/890,935

(22) Filed: Aug. 6, 2007

(65) Prior Publication Data
US 2009/0038887 A1 Feb. 12, 2009

(51) Int. Cl.
*F16H 27/02* (2006.01)
(52) U.S. Cl. .................... 74/89.44; 74/424.81; 184/6.4; 184/6.1
(58) Field of Classification Search ................ 74/89.44, 74/89.4, 424.81; 184/56.4, 6.1, 7.4
See application file for complete search history.

(56) References Cited
U.S. PATENT DOCUMENTS

| | | | | |
|---|---|---|---|---|
| 4,839,831 A | * | 6/1989 | Imajo et al. | 73/53.05 |
| 5,679,883 A | * | 10/1997 | Wedeven | 73/10 |
| 5,809,829 A | | 9/1998 | Seto et al. | 74/89.15 |
| 6,208,245 B1 | * | 3/2001 | Post et al. | 340/457.4 |
| 6,364,058 B1 | | 4/2002 | Nishide et al. | 184/5 |
| 6,451,744 B1 | | 9/2002 | Chang | 508/106 |
| 6,470,735 B1 | * | 10/2002 | Bell | 73/53.05 |
| 6,865,963 B2 | * | 3/2005 | Takanohashi et al. | 74/89.44 |
| 6,880,676 B2 | * | 4/2005 | Tsukada et al. | 184/5 |

\* cited by examiner

*Primary Examiner*—David M Fenstermacher
(74) *Attorney, Agent, or Firm*—Charles E. Baxley

(57) ABSTRACT

A ball screw device includes a number of bearing members engaged between a ball nut and a screw shaft, and a warning signal generating device for generating a warning signal when the lubricating oil is not good enough to lubricate the ball nut and the screw shaft or when the lubrication for the balls or the bearing members or between the ball nut and the screw shaft has become fail or when the lubricating oil may not be suitably supplied to the balls or the bearing members or between the ball nut and the screw shaft, such that the users may be aware when the lubricating oil is not suitably filled or supplied into the raceway and may refill the lubricating oil into the raceway right away.

12 Claims, 16 Drawing Sheets

BALL SCREW DEVICE HAVING LUBRICATION WARNING DEVICE

BACKGROUND OF THE INVENTION

1. Field of the Invention

The present invention relates to a ball screw device, and more particularly to a ball screw device having a lubrication indicating or warning device for generating an indicating or warning signal when the lubrication for the balls or the bearing members or between the ball nut and the screw shaft has become fail or when the lubricating oil may not be suitably supplied to the balls or the bearing members or between the ball nut and the screw shaft.

2. Description of the Prior Art

Typical ball screw devices comprise a ball nut rotatably and/or moveably engaged onto a screw shaft, and normally arranged to allow the ball nut to be rotated and/or moved relative to the screw shaft in great rotational speeds. For allowing the ball nut to be smoothly rotated and moved relative to the screw shaft, a suitable bearing device or lubricating structure is further required to be provided and engaged between the ball nut and the screw shaft, for facilitating the rotational movement between the ball nut and the screw shaft.

For example, U.S. Pat. No. 5,809,829 to Seto et al. discloses one of the typical ball screw devices including a ball nut rotatably and/or moveably engaged onto a screw shaft to allow the ball nut to be rotated and/or moved relative to the screw shaft in great rotational speeds.

However, no lubricating oil has been disclosed and supplied to the balls or the bearing members or between the ball nut and the screw shaft such that a great heat may be generated between the ball nut and the screw shaft when the ball nut is rotated relative to the screw shaft in great rotational speeds.

U.S. Pat. No. 6,364,058 to Nishide et al. discloses another typical ball screw device including a lubricant supply device or an oil supplying structure for supplying oil or lubricant to lubricate the ball nut and the screw shaft and for eliminating the mounting and removal of the oil supplying device.

However, the lubricating oil may be consumed after use and the lubricating oil may not be suitably seen or knew by the users, and/or the consumption of the lubricating oil may not be aware by the users, such that the users may not know when to refill the lubricating oil.

U.S. Pat. No. 6,451,744 to Chang discloses another typical ball screw device or bushing assembly including a bushing or sleeve slidably engaged onto a spindle, and an inbuilt lubricating member or a lubricating collar is solidly attached onto the sleeve for lubricating purposes.

However, similarly, the lubricating oil may also be consumed after use and may not be seen or knew by the users, and/or the consumption of the lubricating material or the lubricating collar may not be aware by the users, such that the users may not know when to change or to replace the lubricating collar.

The present invention has arisen to mitigate and/or obviate the afore-described disadvantages of the conventional ball screw devices for such as machine tools or the like.

SUMMARY OF THE INVENTION

The primary objective of the present invention is to provide a ball screw device including a lubrication indicating or warning device for generating an indicating or warning signal when the lubrication for the balls or the bearing members or between the ball nut and the screw shaft has become fail or when the lubricating oil may not be suitably supplied to the balls or the bearing members or between the ball nut and the screw shaft.

In accordance with one aspect of the invention, there is provided a ball screw device comprising a ball nut including a bore formed therein, and including an inner thread formed therein, a support, a screw shaft rotatably attached to the support and engaged into the bore of the ball nut and including an outer thread formed thereon for engaging with the inner thread of the ball nut and for allowing the ball nut to be rotated and moved relative to the screw shaft, and for forming a helical raceway between the ball nut and the screw shaft and for filling a lubricating oil into the helical raceway, a plurality of bearing members engaged in the helical raceway that is formed between the ball nut and the screw shaft for facilitating a movement between the ball nut and the screw shaft, and a warning signal generating device for generating a warning signal when the lubricating oil is not good enough to lubricate the ball nut and the screw shaft.

The warning signal generating device includes a warning signal generating member for generating a warning signal when the lubricating oil is not suitably supplied into the raceway between the ball nut and the screw shaft.

The warning signal generating device includes an actuating device provided between the warning signal generating member and the screw shaft for selectively and electrically coupling the screw shaft to the warning signal generating member. The actuating device is attached onto the screw shaft, and rotated in concert with the screw shaft.

The actuating device includes a plate, and includes an orifice formed in the plate for rotatably receiving the screw shaft, and includes at least one channel formed in the plate and extended radially, a first conducting member and at least one second conducting member attached to the plate and extended into the channel of the plate, and a follower slidably received in the channel of the plate and movable radially and outwardly away from the orifice of the plate to selectively engage with the first and the second conducting members when the actuating device is rotated relative to the support by the screw shaft.

The first conducting member is electrically coupled to the screw shaft, and the second conducting member is electrically coupled to the warning signal generating member.

The plate includes a passage formed therein and communicating with the channel of the plate, a conductor received in the passage of the plate and selectively contactable with the follower when the follower is moved radially and outwardly away from the orifice of the actuating device.

The warning signal generating device includes a conductive element electrically coupled to the warning signal generating member and electrically coupled to the conductor.

The actuating device includes two covers attached to the plate and having the plate sandwiched between the covers. The covers each include at least one projection extended therefrom and engaged into the channel of the plate for stably receiving the follower in the channel of the plate.

The warning signal generating device includes a housing having an aperture formed therein for receiving the warning signal generating member. The housing includes at least one aperture formed therein for receiving a power indicating member.

The warning signal generating device includes an insert engaged into the housing, and a casing extended from the insert and extended toward the housing for receiving a power supply therein. The housing includes an inner peripheral shoulder formed by a peripheral flange for receiving the insert.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
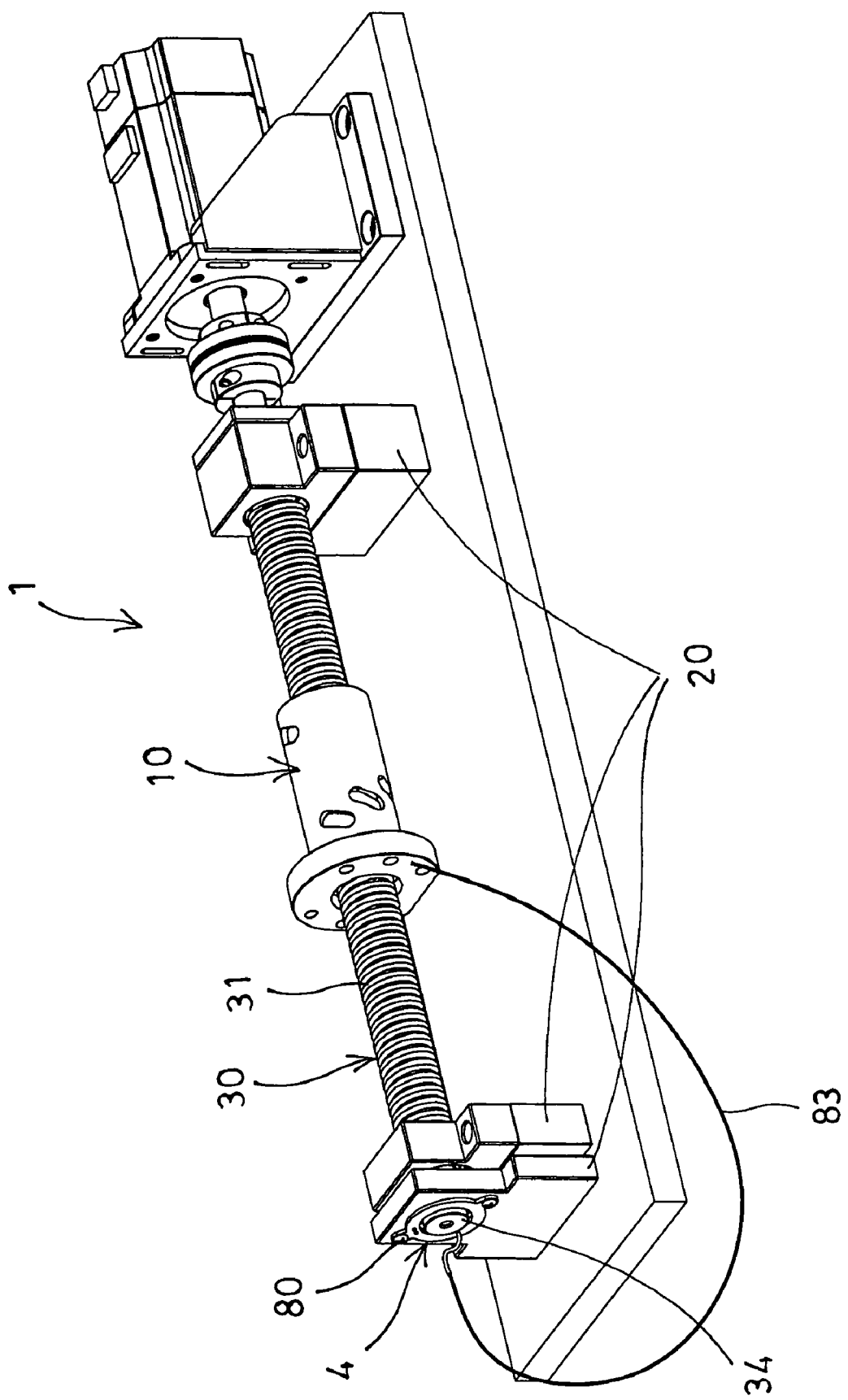
FIG. 1 is a perspective view of a ball screw device in accordance with the present invention.
Figure 2:
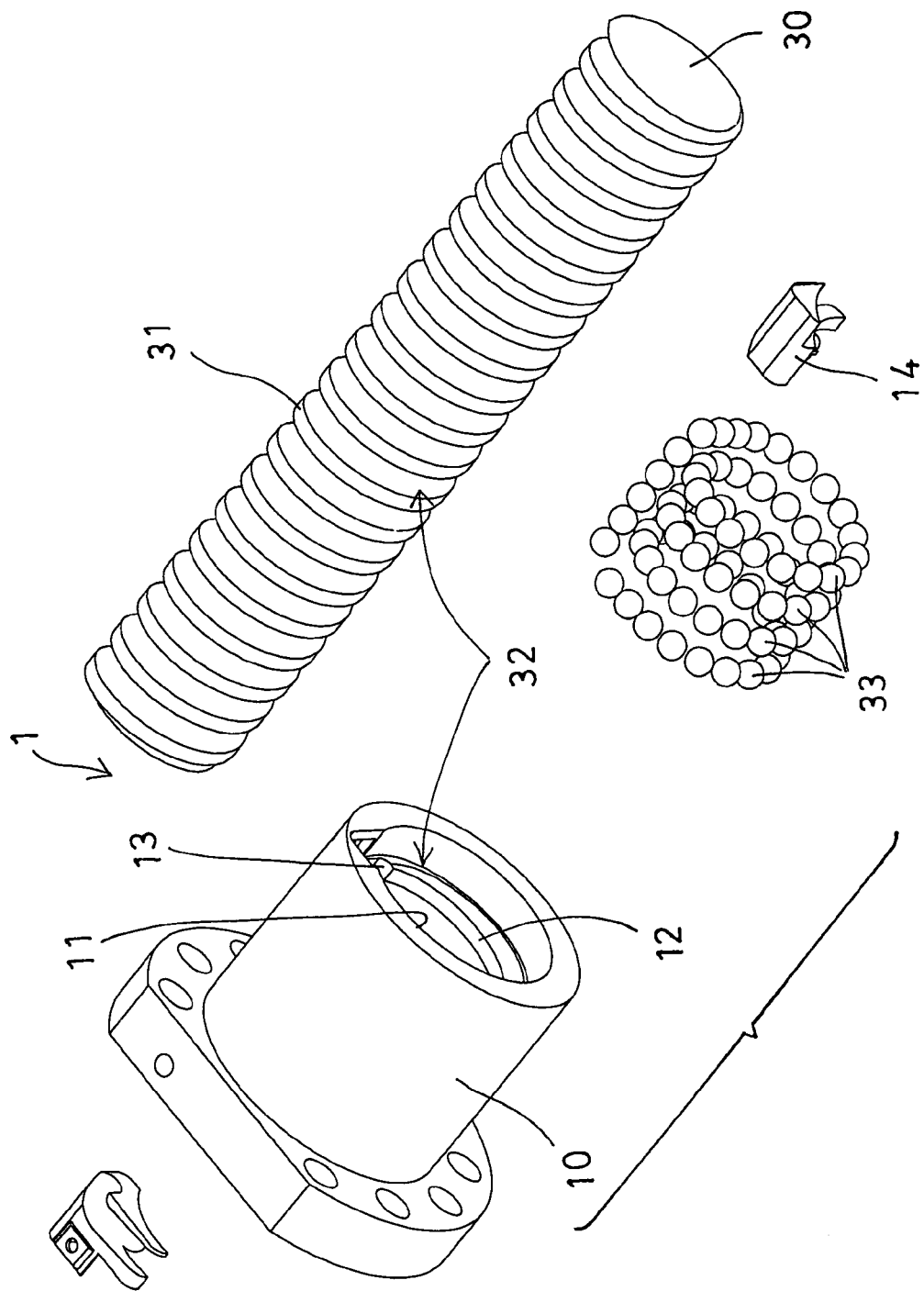
FIG. 2 is a partial exploded view of the ball screw device.

Referring to the drawings, and initially to FIGS. 1-2, a ball screw device 1 in accordance with the present invention comprises an outer ball nut 10 including a bore 11 formed therein for receiving a typical screw shaft 30 which is rotatably supported by one or more supports 20 and which includes an outer thread 31 formed on the outer peripheral portion thereof, and including an inner thread 12 formed in the ball nut 10 for threading with or for engaging with the outer thread 31 of the screw shaft 30 and thus for allowing the ball nut 10 to be smoothly moved along the screw shaft 30, or for allowing the screw shaft 30 to be smoothly rotated and moved relative to the ball nut 10. The threading engagement and/or the rotational engagement between the ball nut 10 and the screw shaft is typical and will not be described in further details.

A multiple turn, helical raceway 32 will be formed between the ball nut 10 and the screw shaft 30 by the outer thread 31 of the screw shaft 30 and the inner thread 12 of the ball nut 10 for rotatably and/or movably receiving one or more groups of balls or rollers or rolling or ball bearing members 33 therein which may facilitate the rotating movement of the ball nut 10 relative to the screw shaft 30 when the screw shaft 30 is forced to rotate relative to the ball nut 10 or when the ball nut 10 is forced to rotate relative to the screw shaft 30, in order to constitute the primary or basic structure of the ball screw device 1. The ball nut 10 includes one or more (such as two) cavities 13 formed therein and communicating with the bore 11 of the ball nut 10 for receiving ball guide or deflecting members 14 therein respectively. A lubricating oil will be filled into the multiple turn, helical raceway 32 for lubricating the ball nut 10 and the screw shaft 30 and the rolling or ball bearing members 33.

Figure 3:
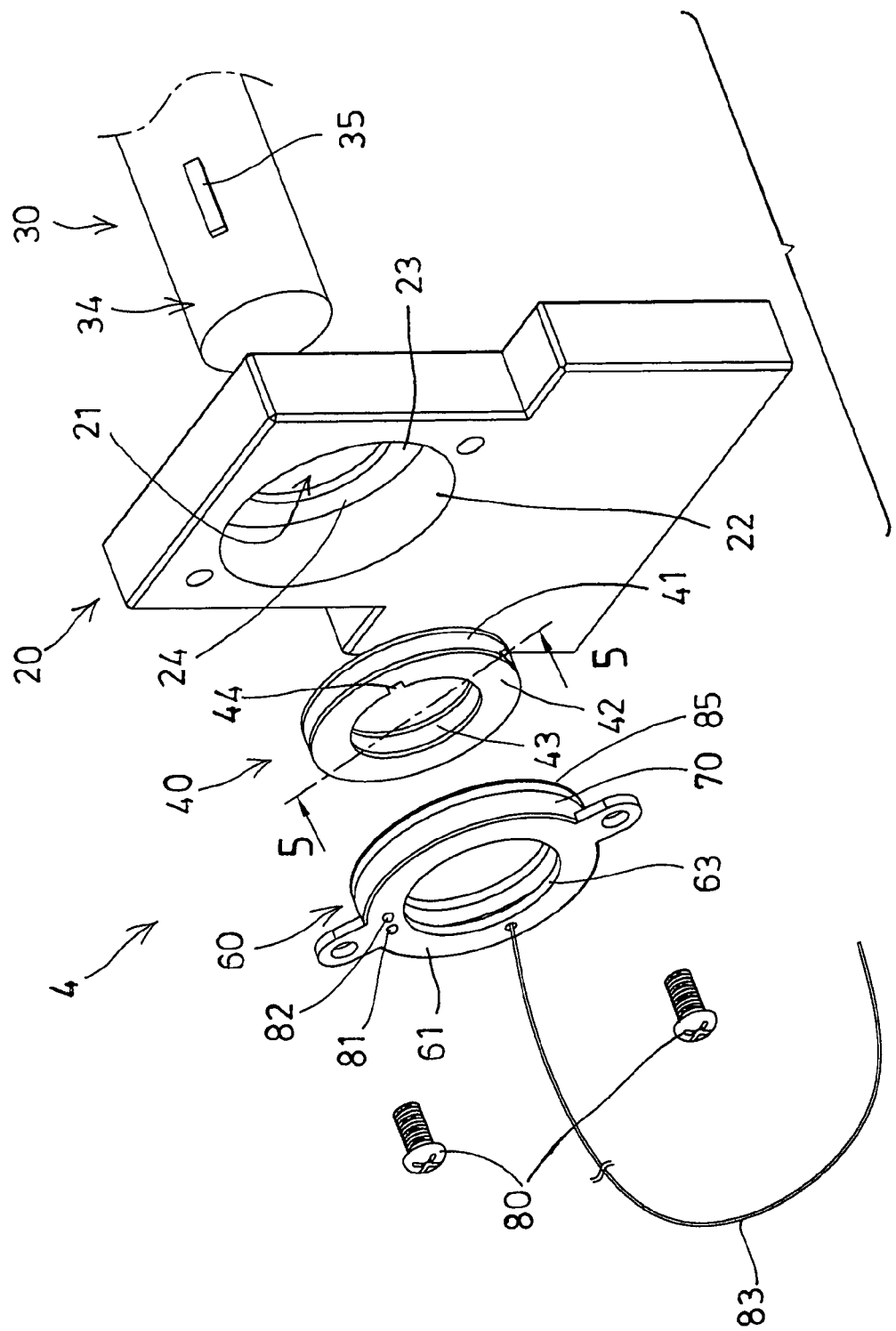
FIG. 3 is another partial exploded view of the ball screw device.
Figure 4:
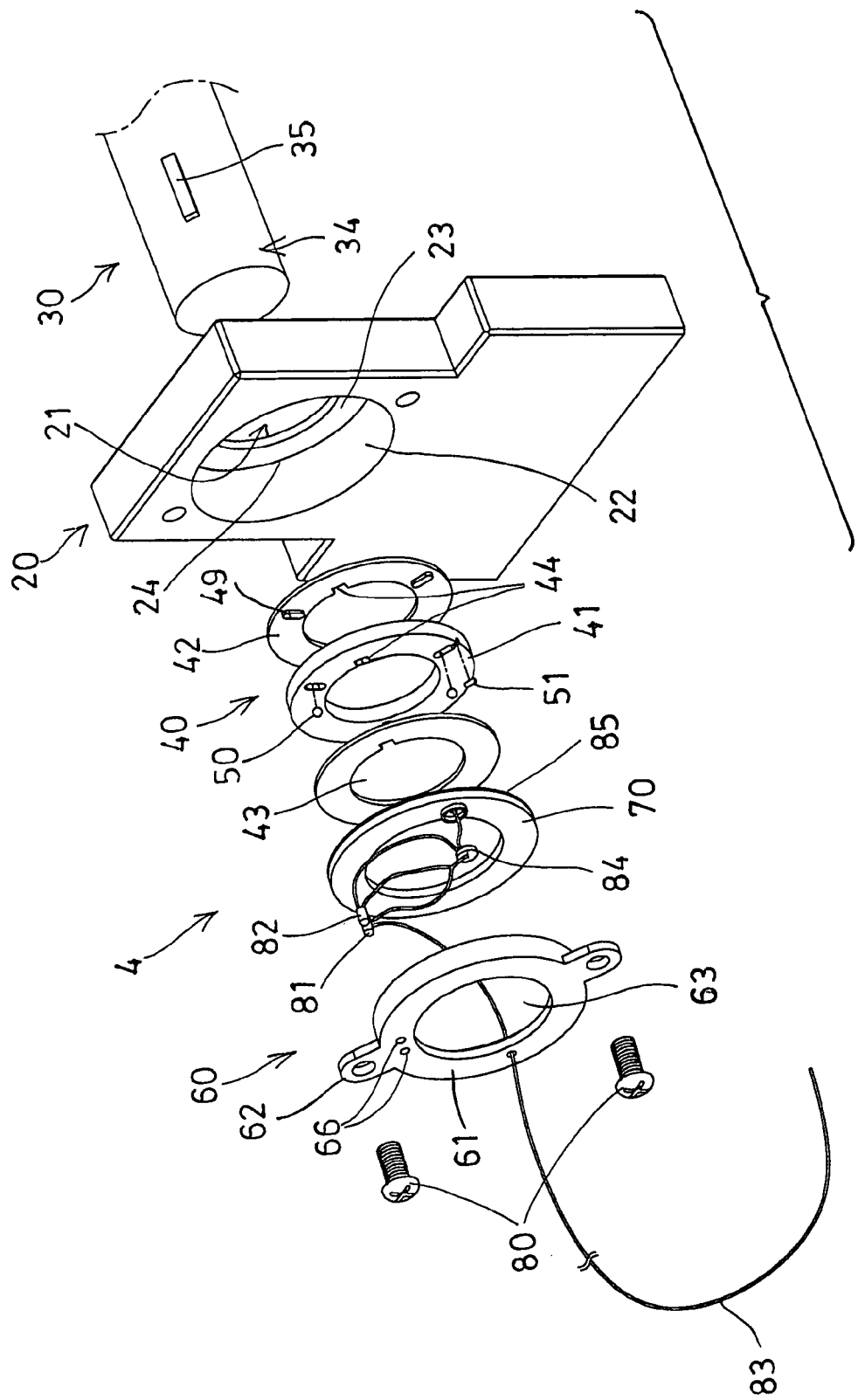
FIG. 4 is a further partial exploded view of the ball screw device.

As shown in FIGS. 3-4, one of the supports 20 includes a bore 21 and an enlarged chamber 22 formed therein and communicating with each other for rotatably receiving one end portion 34 of the screw shaft 30, in which the chamber 22 of the support 20 includes an inner diameter greater than that of the bore 21 of the support 20 for forming a peripheral flange 23 and/or a peripheral shoulder 24 in the support 20. The screw shaft 30 includes a fastener or a key 35 attached or engaged or secured on the one end portion 34 thereof for securing or keying purposes. The chamber 22 of the support 20 is provided for receiving and supporting a lubrication indicating or warning means or device 4 therein which includes an eccentric or switching or actuating means or device 40 and a warning signaling generating means or device 60 that will be described hereinafter.

As shown in FIGS. 3-8, the eccentric or actuating means or device 40 includes an intermediate plate 41 sandwiched or secured between two outer covers 42, and includes an orifice 43 formed therein for rotatably receiving the one end portion 34 of the screw shaft 30, and includes a notch 44 formed therein and communicating with the orifice 43 thereof for engaging with the key 35 and for anchoring or securing or keying the actuating device 40 to the screw shaft 30 and for allowing the actuating device 40 to be rotated in concert with the screw shaft 30, and includes one or more (such as three) channels 45, 46, 47 formed in the plate 41 and extended radially and preferably equally spaced from each other, and a ball or roller or follower 50 slidably received in each of the channels 45, 46, 47 of the plate 41 for allowing the followers 50 to be moved radially and outwardly away from the orifice 43 of the actuating device 40 when the actuating device 40 is rotated relative to the support 20 by the screw shaft 30.

Figure 5:
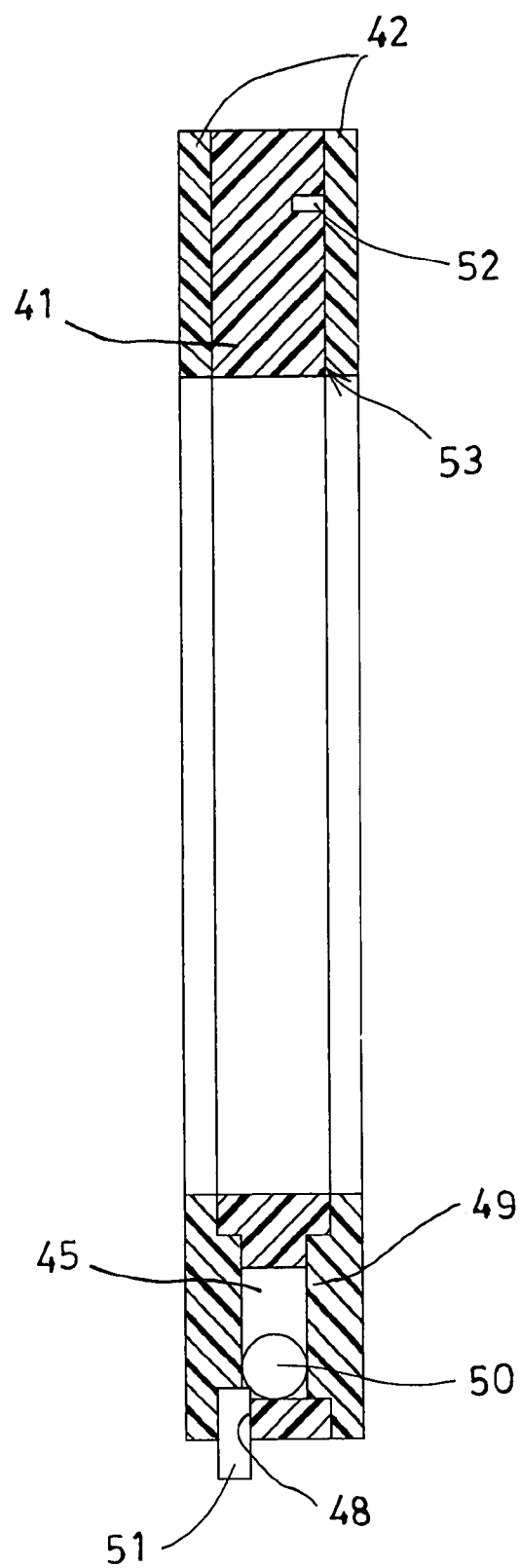
FIG. 5 is a cross sectional view of the ball screw device taken along lines 5-5 of FIG. 3.
Figure 6:
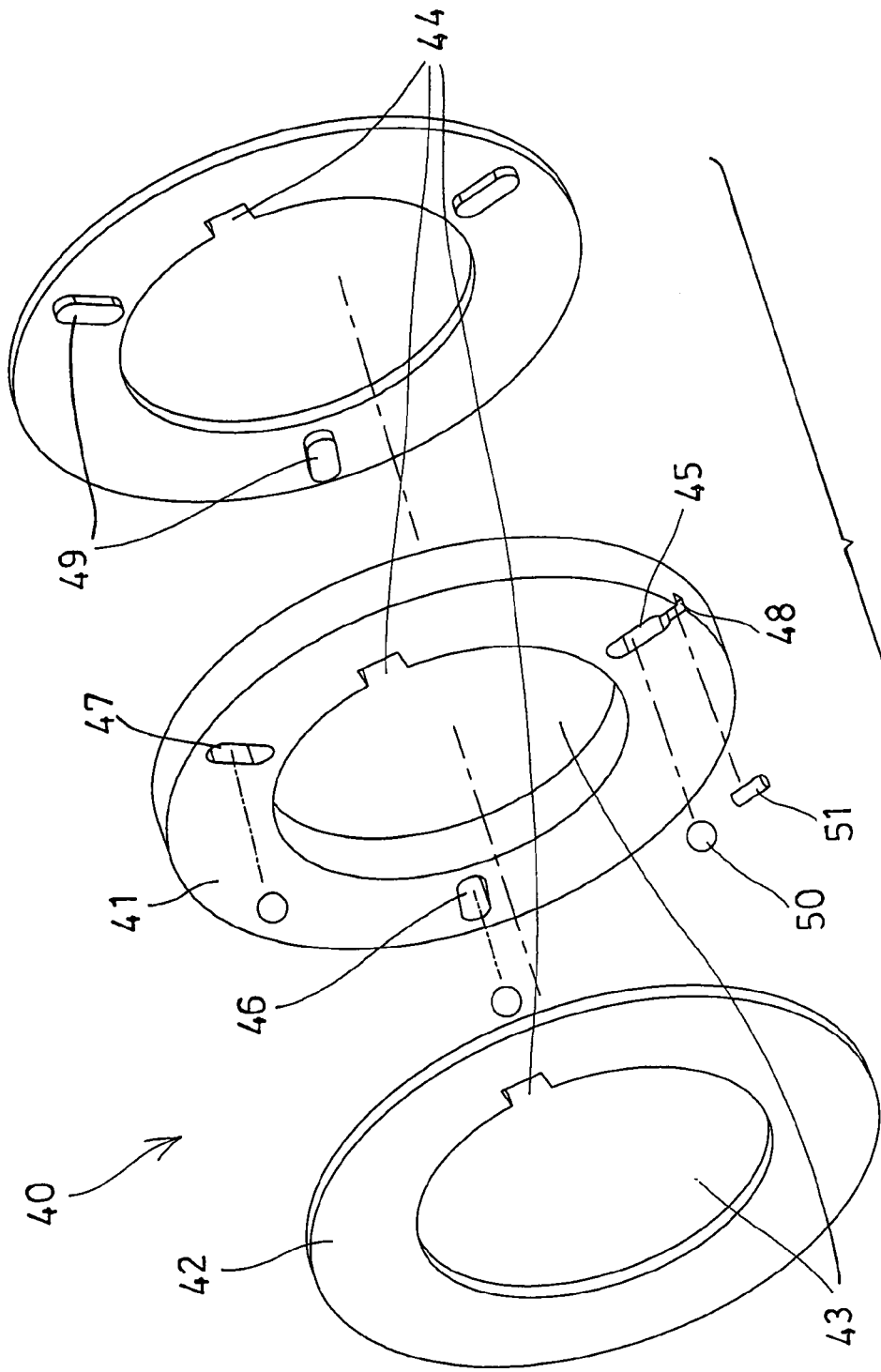
FIG. 6 is a still further partial exploded view of the ball screw device.
Figure 8:
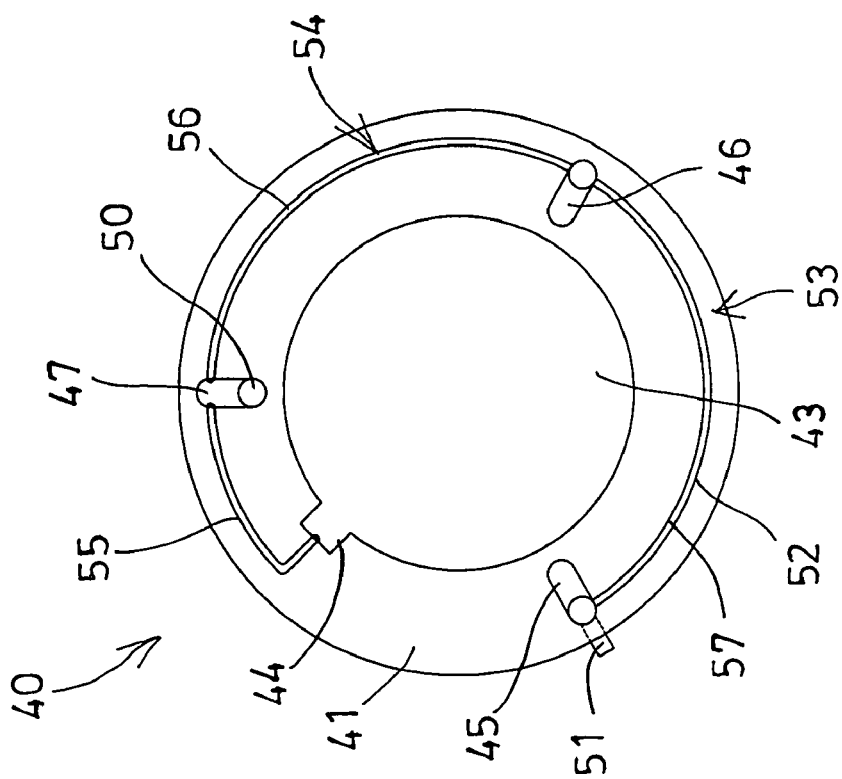
FIG. 8 is a partial plan schematic view of the ball screw device.
Figure 7:
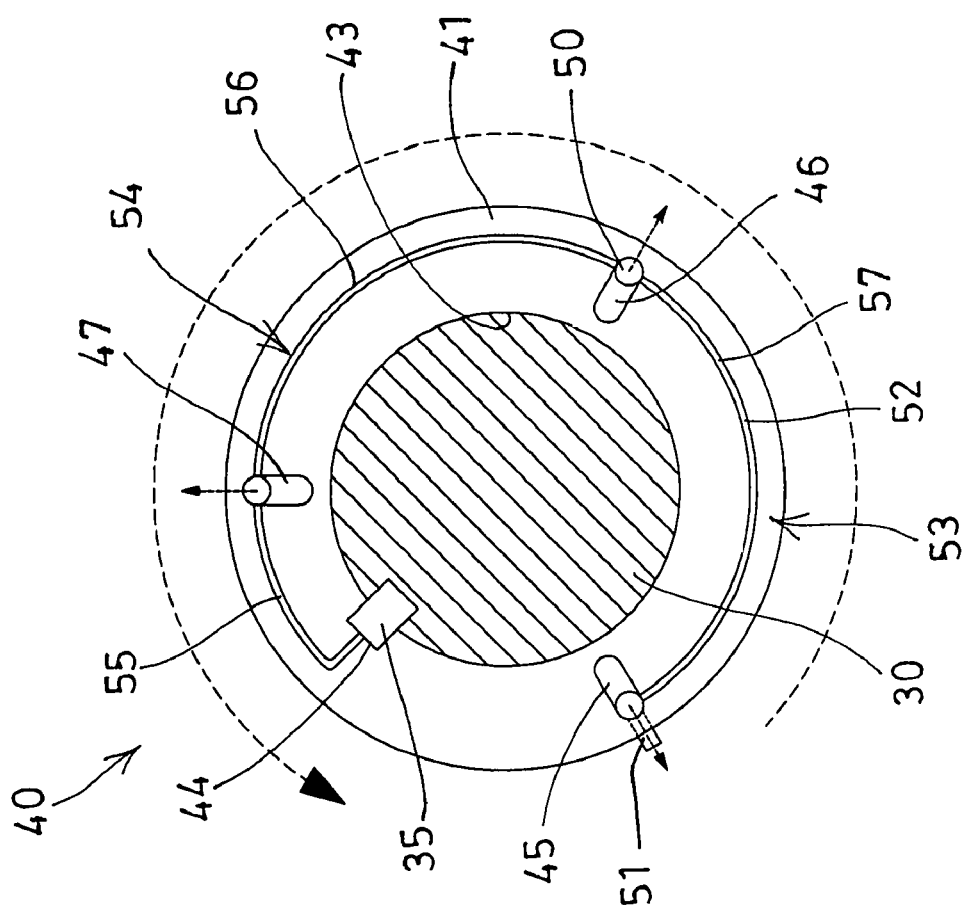
FIG. 7 is a partial cross sectional view of the ball screw device.
Figure 9:
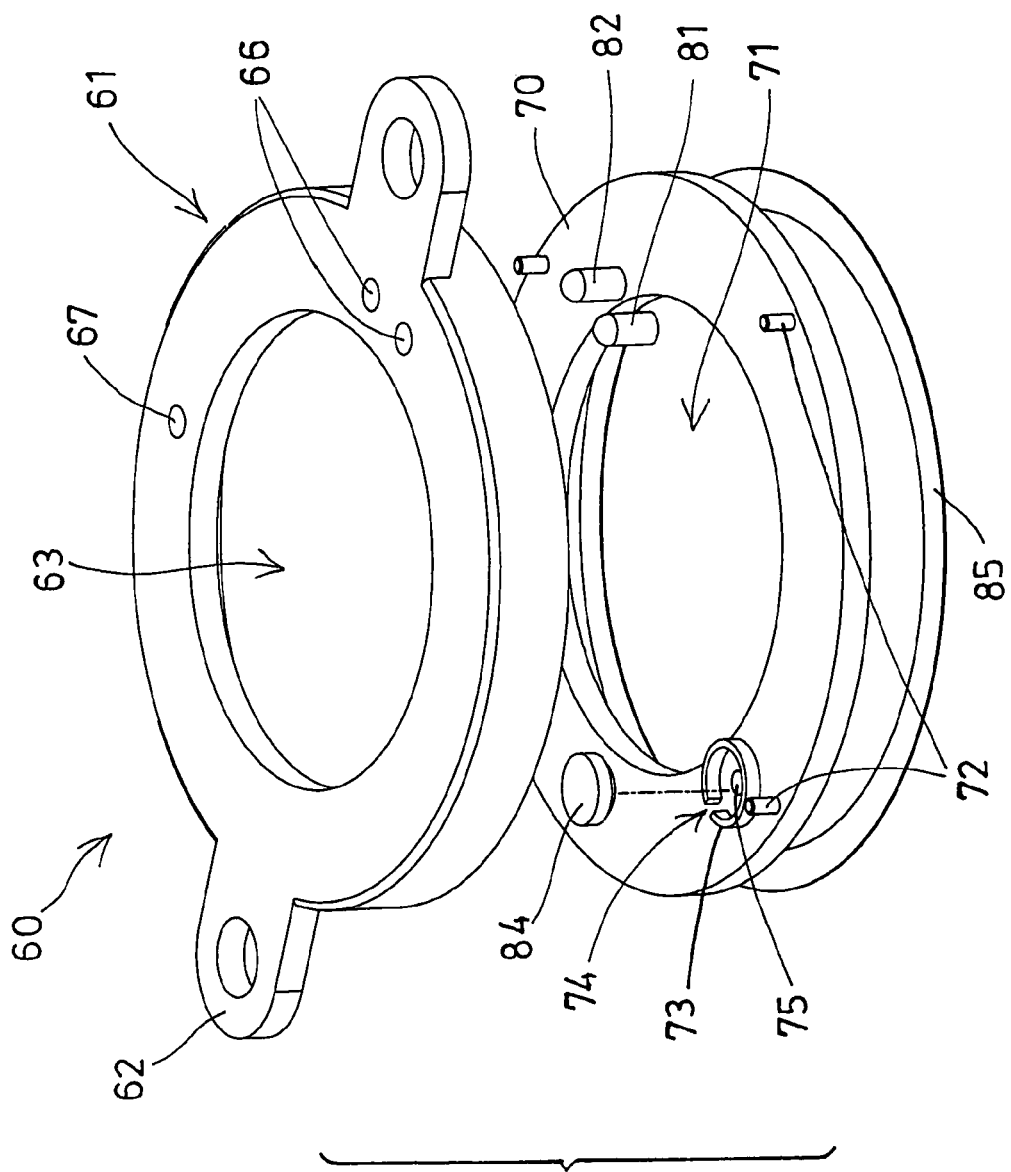
FIGS. 9, 10 are still further partial exploded views of the ball screw device.
Figure 10:
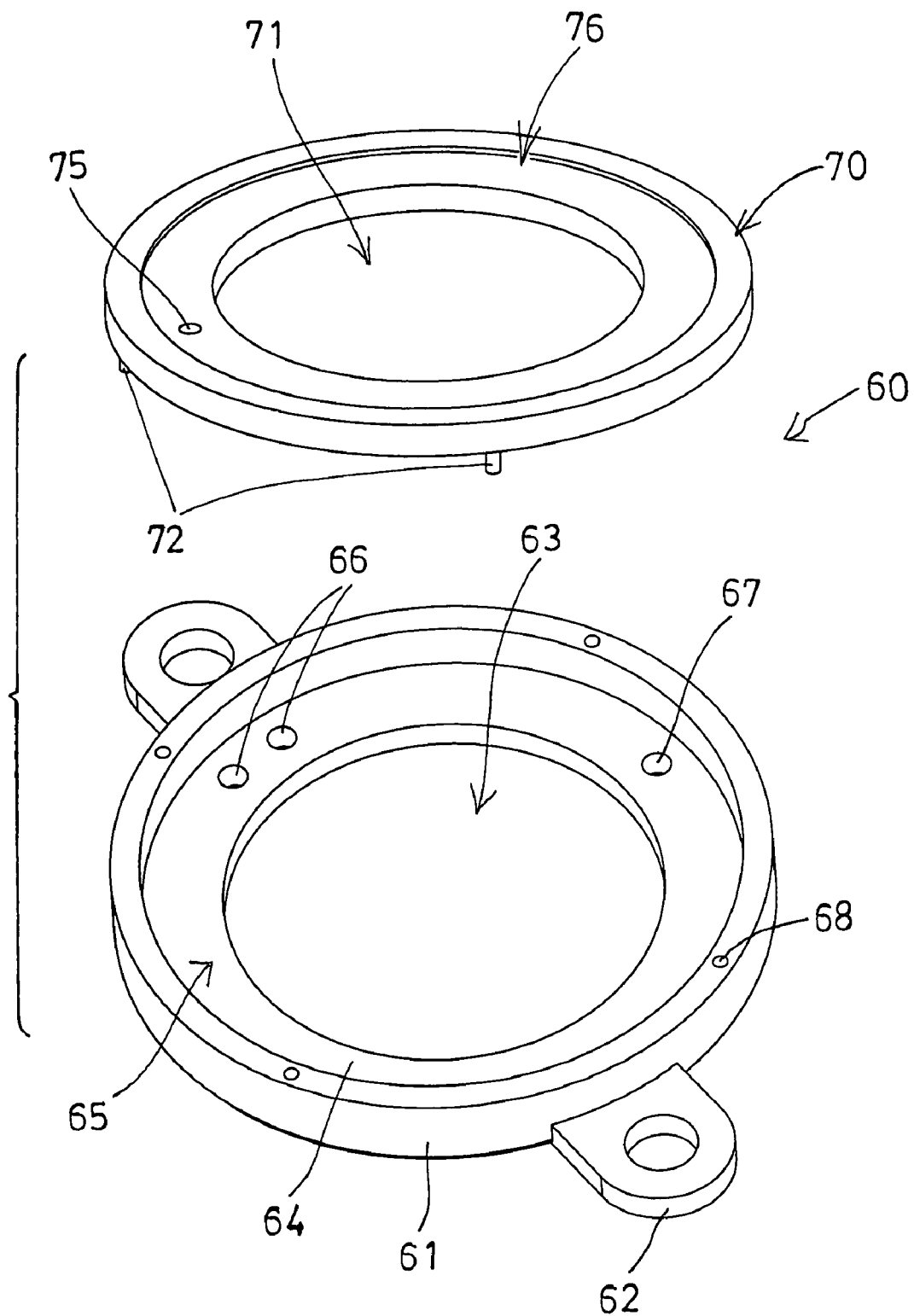

The actuating device 40 further includes a passage 48 formed in the plate 41 and communicating with one of the channels 45 of the plate 41 for receiving a conductor 51 which is extended radially out of the outer peripheral portion of the plate 41 and which is selectively contactable with the follower 50 when the follower 50 is moved radially and outwardly away from the orifice 43 of the actuating device 40 (FIGS. 5, 7-8). The plate 41 and the covers 42 are made of insulated or non-conductive materials. The covers 42 each may includes one or more (such as three) projections 49 (FIGS. 4-6) extended therefrom and extended or engaged into the channels 45 of the plate 41 respectively for stably receiving the followers 50 within the channels 45, 46, 47 of the plate 41 respectively and for allowing the followers 50 only to slide within the channels 45, 46, 47 of the plate 41 respectively.

As shown in FIGS. 5 and 7-8, the plate 41 includes a peripheral slot 52 formed in one side portion 53 thereof and intersecting or communicating with the notch 44 and the channels 45, 46, 47 of the plate 41 respectively for receiving a conducting device 54 therein, in which the conducting device 54 includes three conducting segments or members 55, 56, 57 engaged in the peripheral slot 52 of the plate 41 and partially extended into the notch 44 and the channels 45, 46, 47 of the plate 41 respectively for selectively contacting or engaging with the followers 50 when the followers 50 are moved radially and outwardly away from the orifice 43 of the actuating device 40 (FIGS. 5, 7). As shown in FIG. 8, one or more of followers 50 will not be moved radially and outwardly away from the orifice 43 of the actuating device 40 and will not be contacted or engaged with the conducting segments or members 55, 56, 57 of the conducting device 54 when the actuating device 40 is not rotated by the screw shaft 30.

It is to be noted that the conducting segments or members 55, 56, 57 of the conducting device 54 will not be electrically connected with each other when the followers 50 are not all moved radially and outwardly away from the orifice 43 of the actuating device 40 and are not all electrically connected with all of the conducting segments or members 55, 56, 57 of the conducting device 54, such that the followers 50 and the conducting segments or members 55, 56, 57 of the conducting device 54 may be formed or acted as a switching device. One of the conducting segments or members 55 of the conducting device 54 is extended into the notch 44 of the plate 41 for selectively and electrically connected or contacted or engaged with the key 35 and the screw shaft 30, such that the screw shaft 30 may be selectively and electrically connected or contacted or engaged with the conducting segments or members 55, 56, 57 of the conducting device 54 and the conductor 51, best shown in FIG. 7.

As shown in FIGS. 3-4 and 9-11, the warning signal generating device 60 includes an insulated or non-conductive housing 61 engaged into the chamber 22 of the support 20 and having one or more ears 62 extended radially and outwardly therefrom for securing to the support 20 with one or more fasteners 80 (FIGS. 1, 3, 4), and includes an orifice 63 formed therein for rotatably receiving the one end portion 34 of the screw shaft 30, and includes a peripheral flange 64 extended into the orifice 63 thereof for forming or defining an inner peripheral shoulder 65 therein, and includes two apertures 66 formed therein for receiving the warning signal generating member 81, such as a buzzer or light member, and the power indicating member 82, such as a buzzer or light member therein respectively, and includes a pathway 67 formed therein for receiving or threading or engaging with an electric cable 83 therein or therethrough, and includes one or more cavities 68 formed in the outer peripheral portion thereof.

Figure 11:
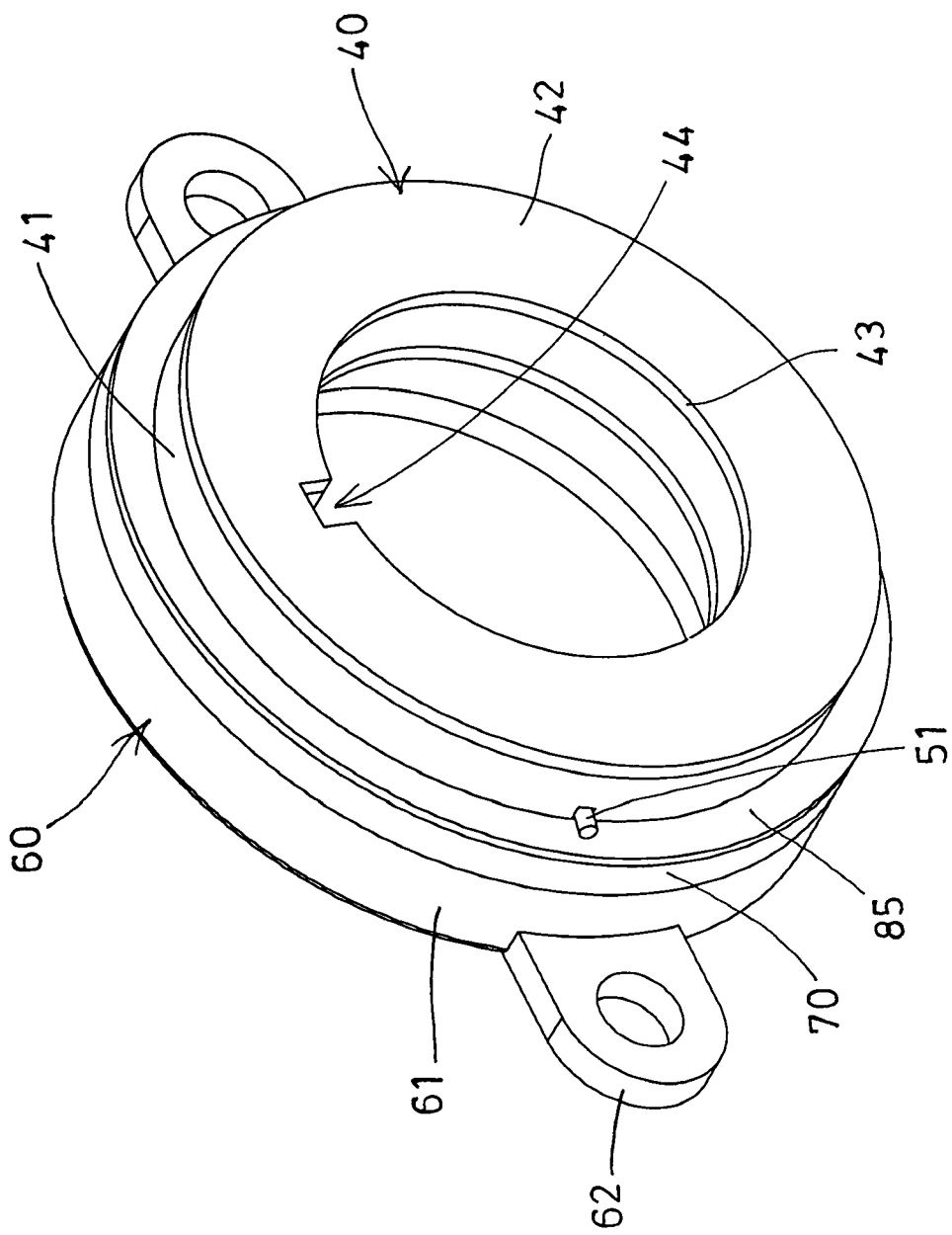
FIG. 11 is a perspective view illustrating a warning device of the ball screw device.

The warning signal generating device 60 further includes an insulated or non-conductive insert 70 to be engaged into the inner peripheral shoulder 65 of the housing 61, and also includes an orifice 71 formed therein for rotatably receiving the one end portion 34 of the screw shaft 30, and includes one or more latch pins 72 extended therefrom for engaging with or into the cavities 68 of the housing 61 and for anchoring or securing or securing the insert 70 to the housing 61, and includes a peripheral casing 73 extended from the insert 70 and extended toward the housing 61 for receiving a power supply 84 therein, such as one or more batteries 84 therein, and includes a void 74 formed in the casing 73 and a passageway 75 formed through the insert 70 for engaging with the electric cable 83 or the like, and includes a peripheral depression 76 formed in the insert 70 (FIG. 10) for partially receiving and positioning the actuating device 40. A ring-shaped conductive element 85 is attached or secured onto the insert 70 and electrically contacted or coupled to the power supply or batteries 84 and also electrically contacted or coupled to the conductor 51 (FIG. 11).

Figure 12:
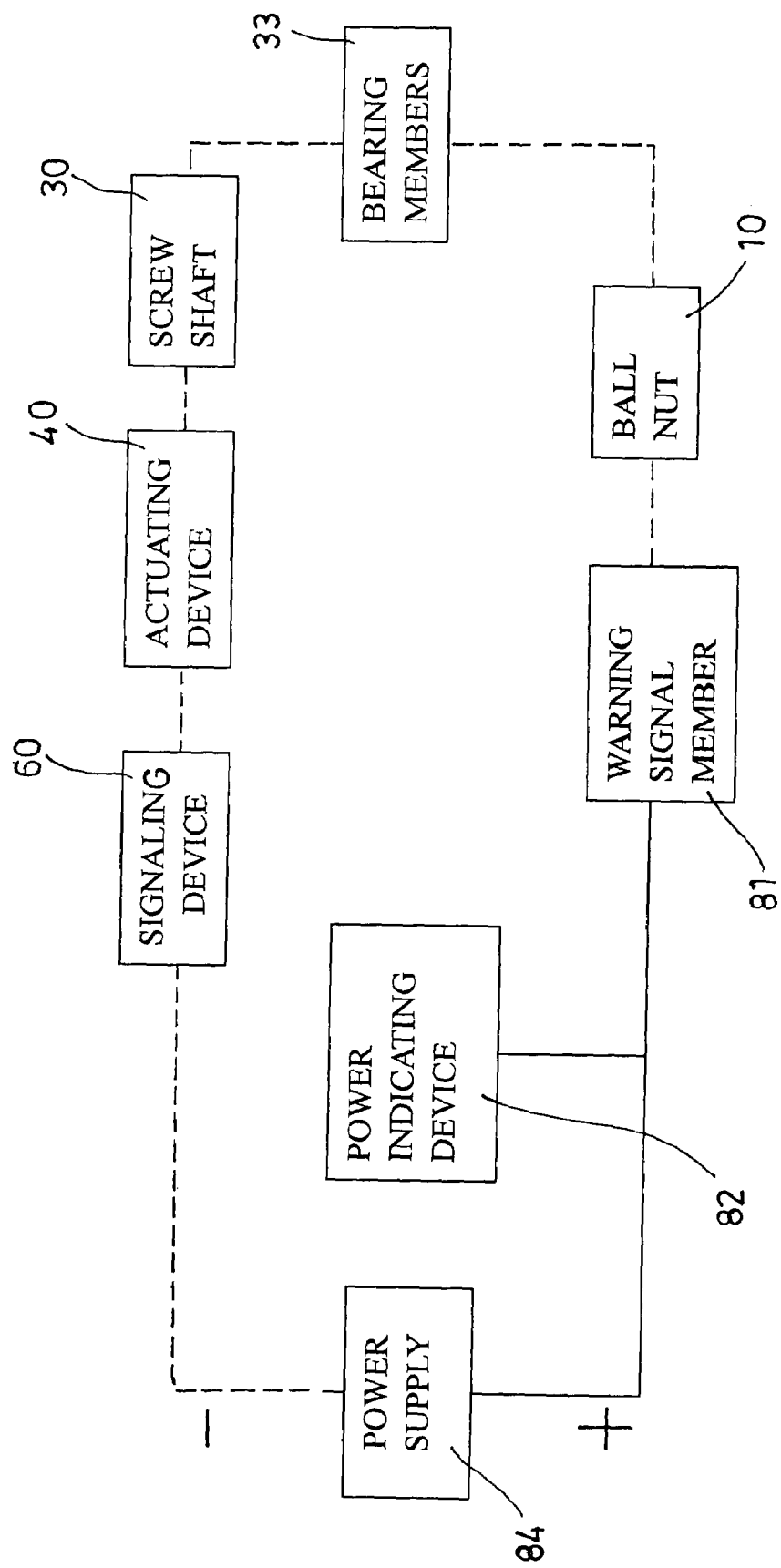
FIG. 12 is a block diagram illustrating the electric coupling of the ball screw device.

As shown in FIG. 12, the ball bearing members 33 which are rotatably and/or movably received or engaged between the ball nut 10 and the screw shaft 30 may be selectively and electrically contacted or engaged with the ball nut 10 and the screw shaft 30, and the screw shaft 30 is electrically contacted or connected with the conducting segments or members 55, 56, 57 of the conducting device 54 and the conductor 51 of the actuating device 40 (FIG. 7), and the conductor 51 is then electrically contacted or connected with the conductive element 85 (FIG. 11) which is then electrically contacted or connected with the warning signal generating device 60 and/or the power supply or batteries 84 and/or the power indicating member 82 (FIG. 4), and the warning signal generating member 81 is electrically contacted or connected between the power supply or batteries 84 and the ball nut 10 with the electric cable 83 (FIGS. 1, 3, 4). The power indicating member 82 may generate an indicating or warning signal when the power supply or batteries 84 are consumed or are short of electric energy or the like.

In operation, when the screw shaft 30 is rotated relative to the ball nut 10 and the supports 20, the actuating device 40 which is keyed to the screw shaft 30 may also be rotated relative to the ball nut 10 and the supports 20, and the followers 50 may be forced to move radially and outwardly away from the orifice 43 of the actuating device 40 to selectively and electrically contact with or engage with the conducting segments or members 55, 56, 57 of the conducting device 54 and thus to selectively and electrically couple the screw shaft 30 and the conductor 51 together, and the conductor 51 will be electrically contacted with or engaged with the conductive element 85 (FIG. 11) and the warning signal generating device 60 and/or the power supply or batteries 84 and/or the power indicating member 82 (FIG. 4), and the warning signal generating member 81 will be electrically contacted or connected between the power supply or batteries 84 and the ball nut 10 with the electric cable 83.

At this moment, when the lubricating oil is suitably filled or supplied into the multiple turn, helical raceway 32 for lubricating the ball nut 10 and the screw shaft 30 and the rolling or ball bearing members 33, the lubricating oil may be formed as an insulated or non-conductive film or layer between the ball nut 10 and the screw shaft 30 in order to switch off the electric coupling between the ball nut 10 and the screw shaft 30 and/or the rolling or ball bearing members 33. On the contrary, when the lubricating oil is not suitably filled or supplied into the multiple turn, helical raceway 32, the rolling or ball bearing members 33 may have a good chance to be electrically contacted or connected with the ball nut 10 and the screw shaft 30, and the power indicating member 82 may then be caused to generate an indicating or warning signal when the ball nut 10 and the screw shaft 30 are electrically contacted or connected with each other by the rolling or ball bearing members 33.

Figure 13:
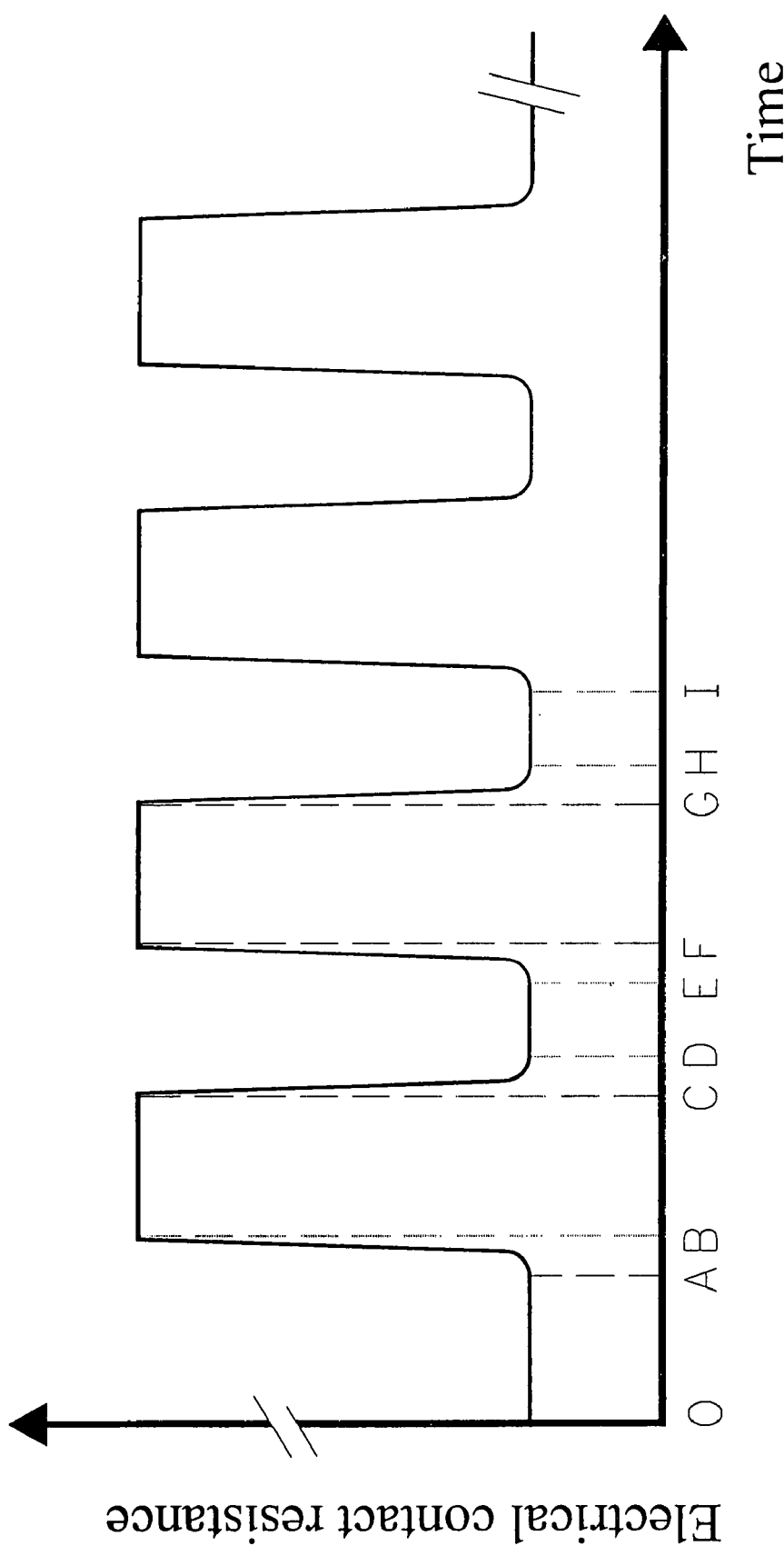
FIG. 13 is a plan schematic view illustrating the operation of the warning device of the ball screw device.
Figure 14:
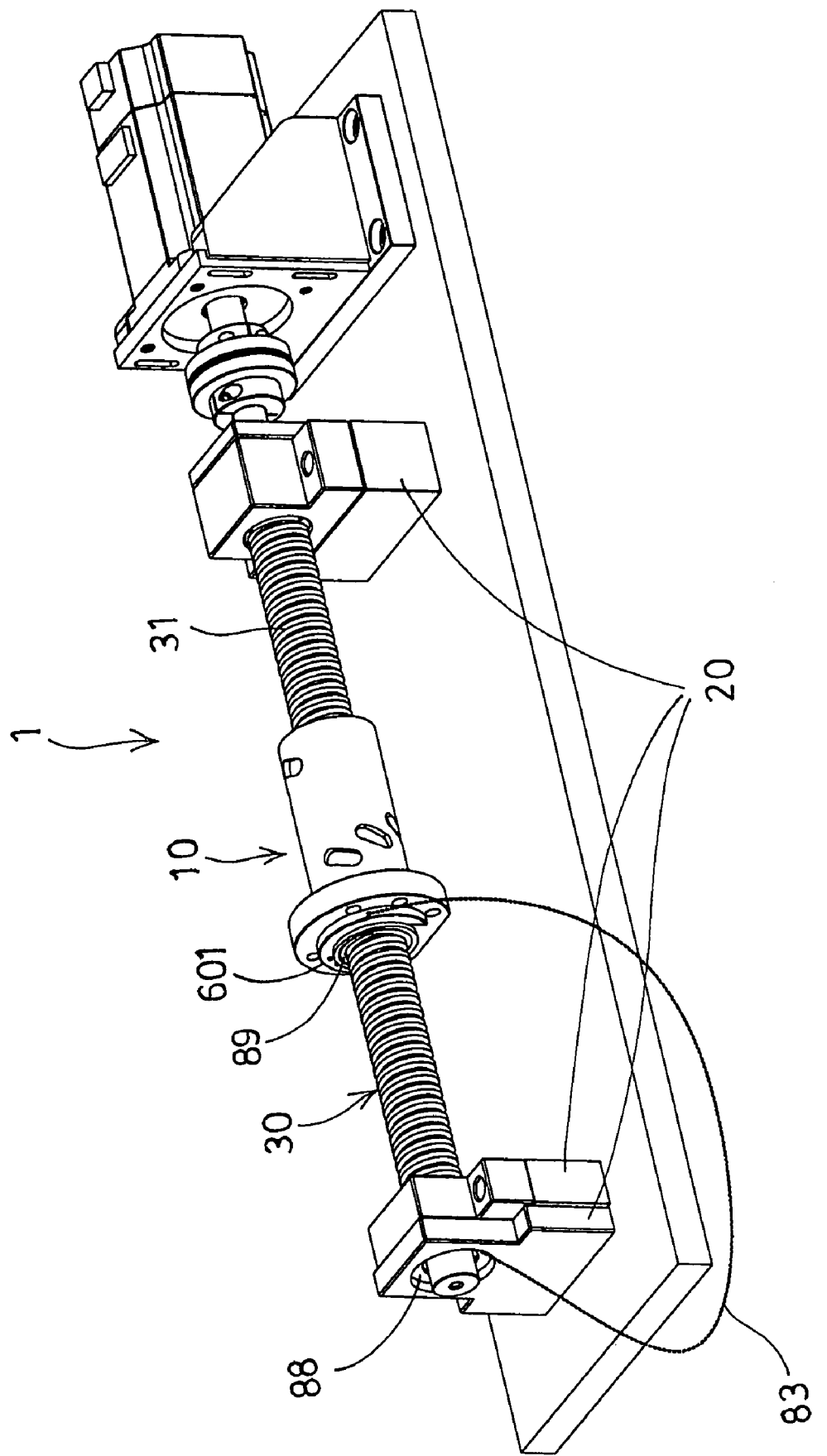
FIG. 14 is a perspective view similar to FIG. 1, illustrating the other arrangement of the ball screw device.
Figure 15:
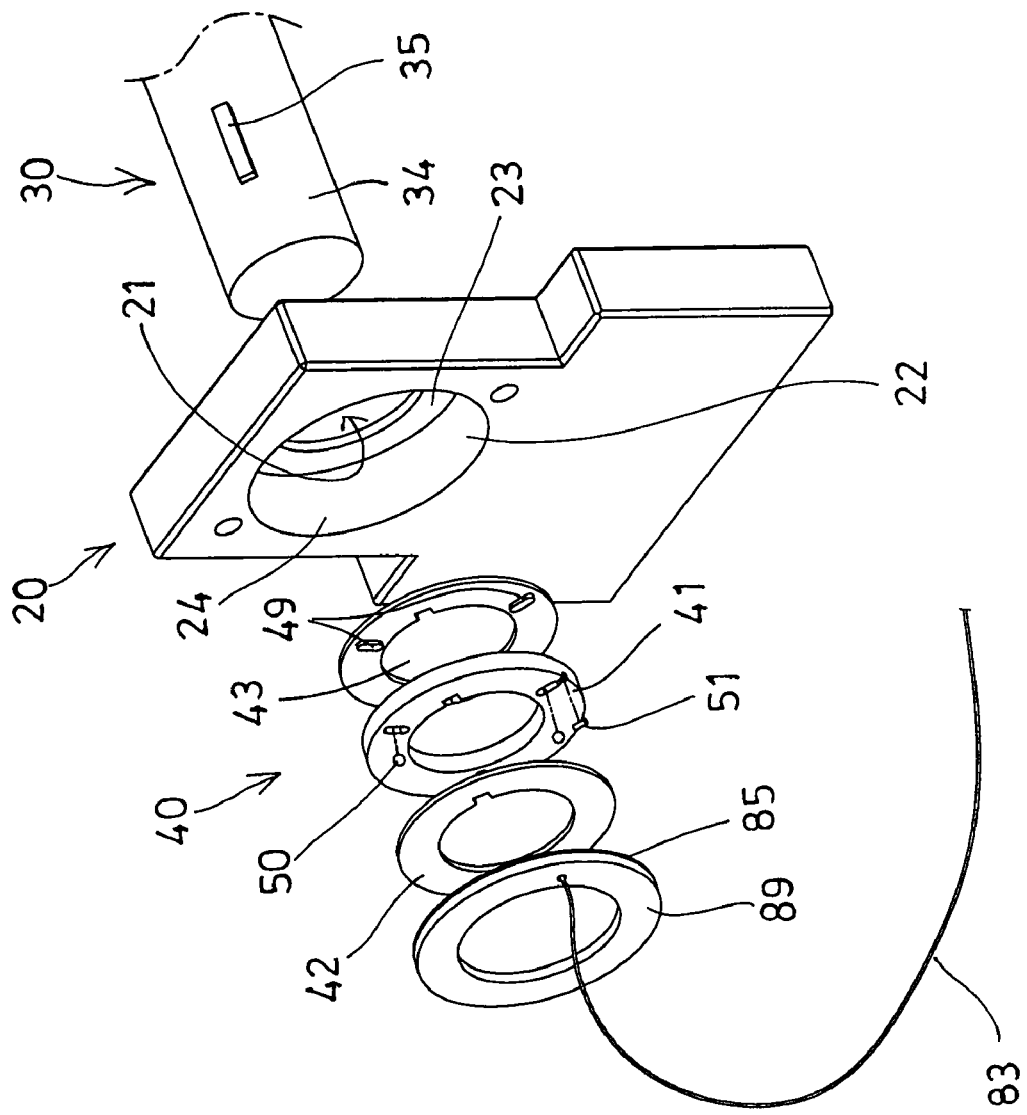
FIGS. 15, 16 are partial exploded views of the ball screw device as shown in FIG. 14.
Figure 16:
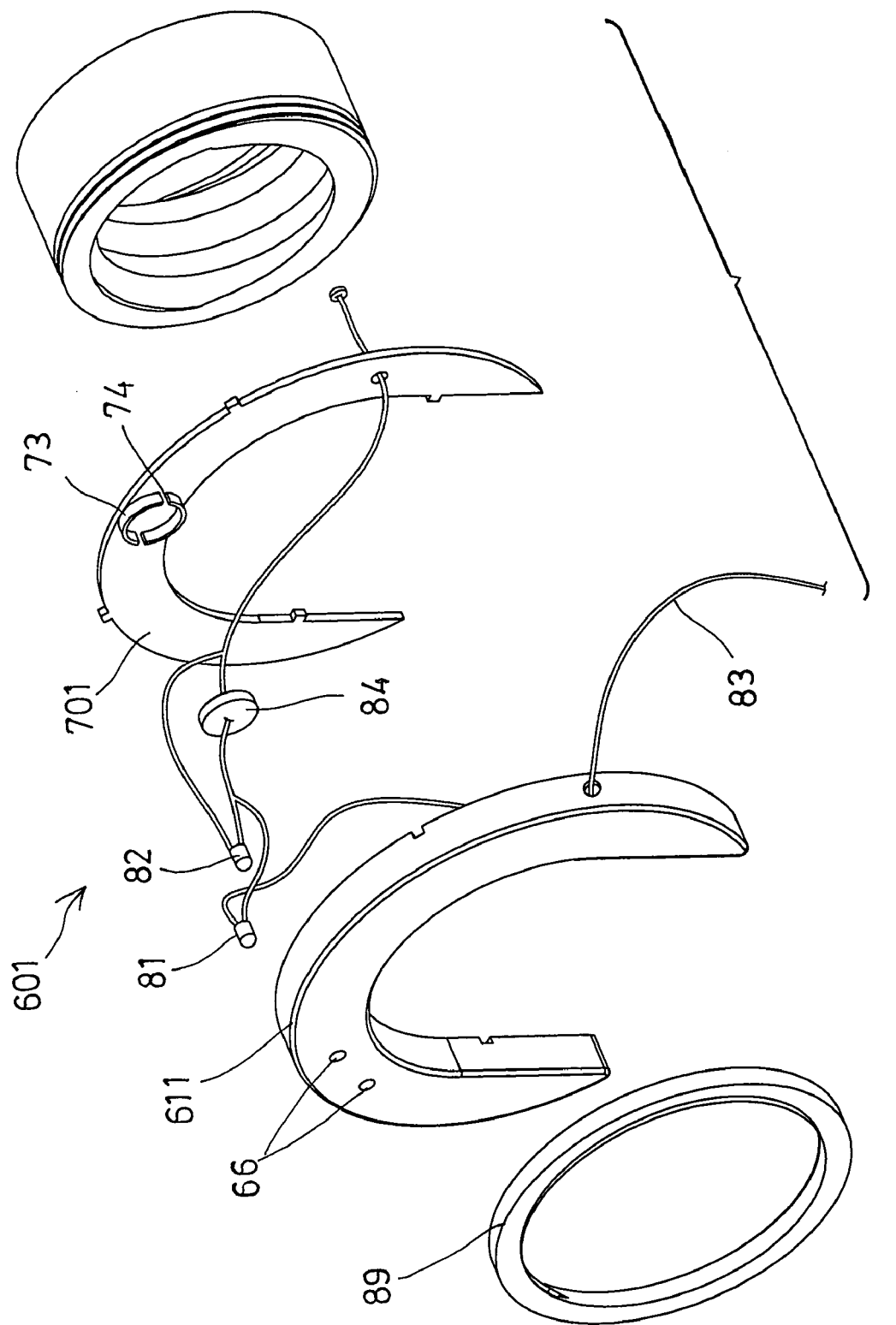
Figure 17:
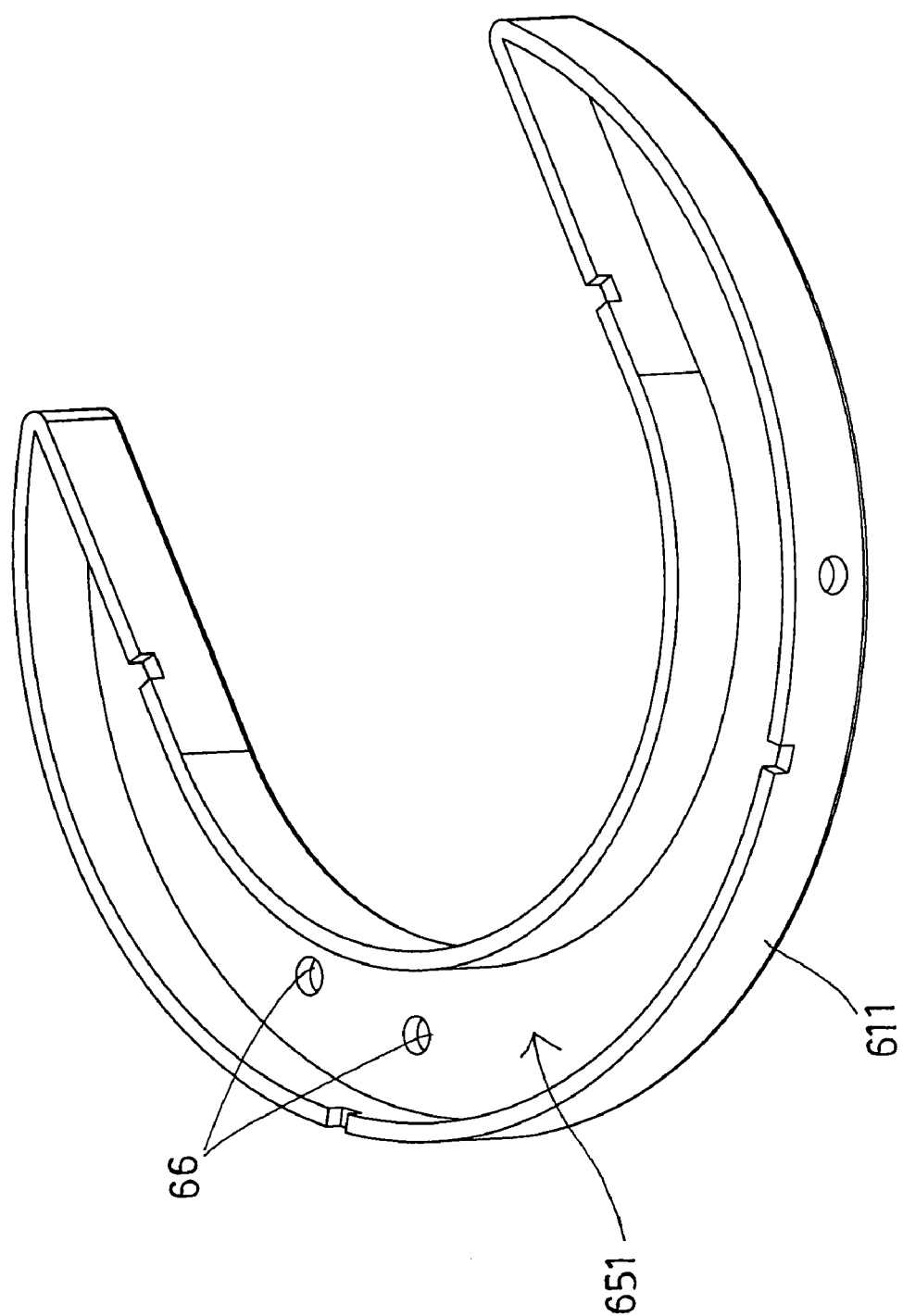
FIG. 17 is a perspective view illustrating an element or a part of the warning device of the ball screw device.

As shown in FIG. 13, the electrical contact resistance between the ball nut 10 and the screw shaft 30 will be lowered to or maintained at such as zero or a lower level, between O and A when the screw shaft 30 is not rotated relative to the ball nut 10 and the supports 20, and the screw shaft 30 will begin to rotate relative to the ball nut 10 and the supports 20 from point A. Between A and B, the lubricating oil may be gradually formed as an insulated or non-conductive film or layer between the ball nut 10 and the screw shaft 30, and between B and C, the electrical contact resistance between the ball nut 10 and the screw shaft 30 will be increased to the high level in order to switch off the electric coupling between the ball nut 10 and the screw shaft 30 and/or the rolling or ball bearing members 33, and the lubricating oil or the insulated or non-conductive film or layer may switch off the electric coupling between the ball nut 10 and the screw shaft 30 and/or the rolling or ball bearing members 33 when the lubricating oil is suitably filled or supplied into the raceway 32 between the ball nut 10 and the screw shaft 30 and the rolling or ball bearing members 33.

Between C and D, the rotational speed of the screw shaft 30 is gradually decreased, the insulated or non-conductive film or layer may not be suitably formed between the ball nut 10 and the screw shaft 30, and the electrical contact resistance between the ball nut 10 and the screw shaft 30 will be lowered to such as zero or a lower level again, between D and E when the screw shaft 30 is stopped or is not rotated relative to the ball nut 10 and the supports 20, the electrical contact resistance between the ball nut 10 and the screw shaft 30 will be maintained at such as zero or a lower level again, and the screw shaft 30 will begin to rotate relative to the ball nut 10 and the supports 20 in the reverse direction from point E. Between E and F, the lubricating oil may be gradually formed as an insulated or non-conductive film or layer between the ball nut 10 and the screw shaft 30, and between F and G, the electrical contact resistance between the ball nut 10 and the screw shaft 30 will be increased to the high level again in order to switch off the electric coupling between the ball nut 10 and the screw shaft 30 and/or the rolling or ball bearing members 33 again.

The lubricating oil or the insulated or non-conductive film or layer may switch off the electric coupling between the ball nut 10 and the screw shaft 30 and/or the rolling or ball bearing members 33 when the lubricating oil is suitably filled or supplied into the raceway 32 between the ball nut 10 and the screw shaft 30 and the rolling or ball bearing members 33. Between G and H, the rotational speed of the screw shaft 30 will be gradually decreased again for changing the rotational direction, the insulated or non-conductive film or layer also may not be suitably formed between the ball nut 10 and the screw shaft 30, and the electrical contact resistance between the ball nut 10 and the screw shaft 30 will be lowered to such as zero or a lower level again, between H and I when the screw shaft 30 is stopped or is not rotated relative to the ball nut 10 and the supports 20, the electrical contact resistance between the ball nut 10 and the screw shaft 30 will be maintained at such as zero or a lower level again. The warning signal generating member 81 may be actuated or caused to generate an indicating or warning signal when the lubricating oil is not suitably filled or supplied into the raceway 32 between the ball nut 10 and the screw shaft 30 and the rolling or ball bearing members 33.

Accordingly, when the lubricating oil is suitably filled or supplied into the raceway 32 between the ball nut 10 and the screw shaft 30 and the rolling or ball bearing members 33, the lubricating oil may be suitably formed as an insulated or non-conductive film or layer between the ball nut 10 and the screw shaft 30 to switch off the electric coupling between the ball nut 10 and the screw shaft 30 and/or the rolling or ball bearing members 33. On the contrary, when the lubricating oil is not suitably filled or supplied into the raceway 32, the rolling or ball bearing members 33 may be electrically contacted or connected with the ball nut 10 and the screw shaft 30, and the power indicating member 82 may then be caused to generate an indicating or warning signal when the ball nut 10 and the screw shaft 30 are electrically contacted or connected with each other by the rolling or ball bearing members 33 such that the users may be aware when the lubricating oil is not suitably filled or supplied into the raceway 32 and may then refill the lubricating oil into the raceway 32 right away.

Alternatively, as shown in FIGS. 14-17, a container 88 may be provided for receiving the actuating device 40 and for attaching the actuating device 40 to the support 20 with such as force-fitted engagements, and the insulated or non-conductive housing 611 and/or the insulated or non-conductive insert 701 of the warning signal generating device 601 may include an opened structure for attaching onto the ball nut 10 and for engaging with or securing to the ball nut 10 with a lock nut or fastener 89, and the housing 611 may include a recessed space 651 for receiving the insert 701 having the corresponding structure or shape.

It is to be noted that the typical ball screw devices failed to provide or to teach any lubrication indicating or warning device for generating an indicating or warning signal when the lubrication for the balls or the bearing members or between the ball nut and the screw shaft has become fail or when the lubricating oil may not be suitably supplied to the balls or the bearing members or between the ball nut and the screw shaft, or when the lubricating oil is not good enough to lubricate the ball nut and the screw shaft, such that the users may not be aware when the lubricating oil is not suitably filled or supplied into the raceway 32 and when to refill the lubricating oil into the raceway 32 of the ball screw device.

Accordingly, the ball screw device in accordance with the present invention includes a lubrication indicating or warning device for generating an indicating or warning signal when the lubrication for the balls or the bearing members or between the ball nut and the screw shaft has become fail or when the lubricating oil may not be suitably supplied to the balls or the bearing members or between the ball nut and the screw shaft.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
    a ball nut including a bore formed therein, and including an inner thread formed therein,
    a support,
    a screw shaft rotatably attached to said support and engaged into said bore of said ball nut and including an outer thread formed thereon for engaging with said inner thread of said ball nut and for allowing said ball nut to be rotated and moved relative to said screw shaft, and for forming a helical raceway between said ball nut and said screw shaft and for filling a lubricating oil into said helical raceway,
    a plurality of bearing members engaged in said helical raceway that is formed between said ball nut and said screw shaft for facilitating a movement between said ball nut and said screw shaft,
    a warning signal generating member provided for generating a warning signal when said lubricating oil is not suitably supplied into said raceway between said ball nut and said screw shaft, and
    an actuating device provided between said warning signal generating member and said screw shaft for selectively and electrically coupling said screw shaft to said warning signal generating member.

2. The ball screw device as claimed in claim 1, wherein said actuating device is attached onto said screw shaft, and rotated in concert with said screw shaft.

3. The ball screw device as claimed in claim 2, wherein said actuating device includes a plate, and includes an orifice formed in said plate for rotatably receiving said screw shaft, and includes at least one channel formed in said plate and extended radially, a first conducting member and at least one second conducting member attached to said plate and extended into said at least one channel of said plate, and a follower slidably received in said at least one channel of said plate and movable radially and outwardly away from said orifice of said plate to selectively engage with said first and said at least one second conducting members when said actuating device is rotated relative to said support by said screw shaft.

4. The ball screw device as claimed in claim 3, wherein said first conducting member is electrically coupled to said screw shaft, and said at least one second conducting member is electrically coupled to said warning signal generating member.

5. The ball screw device as claimed in claim 4, wherein said plate includes a passage formed therein and communicating with said at least one channel of said plate, a conductor received in said passage of said plate and selectively contactable with said follower when said follower is moved radially and outwardly away from said orifice of said actuating device.

6. The ball screw device as claimed in claim 5, wherein a conductive element is electrically coupled to said warning signal generating member and electrically coupled to said conductor.

7. The ball screw device as claimed in claim 3, wherein said actuating device includes two covers attached to said plate and having said plate sandwiched between said covers.

8. The ball screw device as claimed in claim 7, wherein said covers each include at least one projection extended therefrom and engaged into said at least one channel of said plate for stably receiving said follower in said at least one channel of said plate.

9. The ball screw device as claimed in claim 1, wherein a housing includes an aperture formed therein for receiving said warning signal generating member.

10. The ball screw device as claimed in claim 9, wherein said housing includes at least one aperture formed therein for receiving a power indicating member.

11. The ball screw device as claimed in claim 9, wherein an insert is engaged into said housing, and a casing is extended from said insert and extended toward said housing for receiving a power supply therein.

12. The ball screw device as claimed in claim 11, wherein said housing includes an inner peripheral shoulder formed by a peripheral flange for receiving said insert.

* * * * *